Feb. 18, 1969     A. F. JOHNSON     3,428,545

CARBON FURNACE ELECTRODE ASSEMBLY

Original Filed Oct. 22, 1962

INVENTOR.
Arthur F. Johnson
BY
Mann & Jangarathis
Attys.

United States Patent Office 3,428,545
Patented Feb. 18, 1969

3,428,545
CARBON FURNACE ELECTRODE ASSEMBLY
Arthur F. Johnson, 5700 Arlington Ave.,
Riverdale, N.Y. 10471
Original application Oct. 22, 1962, Ser. No. 231,969, now Patent No. 3,372,105, dated Mar. 5, 1968. Divided and this application Oct. 25, 1967, Ser. No. 695,301
U.S. Cl. 204—290                                 8 Claims
Int. Cl. B01k 3/08

ABSTRACT OF THE DISCLOSURE

Insulating material is provided wherein heat insulating, electrical insulating and/or chemical insulating refractories are bonded to a suitable substrate whereby the resulting material may be placed in a relationship to the substance to be insulated so that oxidation of said substance is avoided.

---

Figure 1:
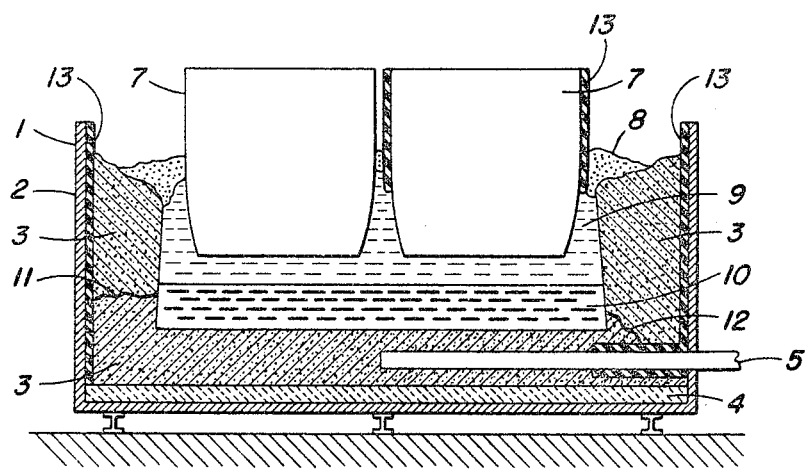

This application is a division of application Ser. No. 231,969, filed Oct. 22, 1962, now U.S. Patent No. 3,372,105, issued Mar. 5, 1968.

This invention relates in general to insulating materials and more particularly to the production and use of heat insulating, electrical insulating and chemical insulating refractories bonded to paper, cloth, plastic or metal foil. The invention has for an object the provision of a simple means of manufacturing and utilizing thin refractories to reduce heat losses, electrical short circuits and corrosion, particularly in the metallurgical, chemical and construction industries. Various other objects and advantages will appear from the following description of several embodiments of the invention, and the novel features will be particularly pointed out hereinafter in connection with the appended claims. The utility of the invention may best be illustrated by citing existing problems in industry and illustrating how this invention helps to overcome these problems.

The invention may be applied, for example, in aluminum reduction furnaces. In Hall type of electrolytic furnaces, commonly known as "pots," used by the aluminum industry to reduce alumina from a bath of molten cryolite, a problem exists in thermally, electrically and chemically insulating the furnace carbon cathode (known as the pot lining) from the steel shell, and also insulating end portions of the cathode collector bars from the carbon cathode in which they are buried. The steel shell holds the pot lining tightly together, thus tending to prevent cracks from developing in the side and bottom of the carbon pot lining. Pressure from the shell is not overly effective in this regard, however, and cracks on the lining are a relatively common cause of furnace failure. Side lining cracks, when they develop, allow the molten electrolyte and molten aluminum (at 1,800° F.) to run through the carbon pot lining, out to the steel shell, and eat through the steel by alloying therewith, thus allowing the molten contents of the furnace to run out onto the pot room floor. This, of course, requires the operator to shut down the furnace; such a happening is known as a "tap-out."

A second source of failure through cracking of the lining involves the iron cathode collector bars imbedded within the carbon lining. Cracks in the bottom of the pot lining may develop near the pot sides, allowing the molten aluminum to reach the iron collector bars, alloy therewith and cut them off. This upsets even current distribution over the bottom of the electric furnace. The fact that an electrical potential of about 0.3 to 0.5 volt exists between the molten aluminum pool and the collector bars and steel shell serves to heat the molten aluminum in these cracks within the lining and in contact with the shell and this speeds the penetration of steel by aluminum by causing it to alloy with the steel more readily.

A thin, continuous sheet of refractory material is ample to electrically insulate the steel shell or collector bar ends against the 0.3 to 0.5 volt potential. While many types of refractories have been used between the pot side lining and the steel shell and around the collector bars, these refractories have obviously proven generally unsatisfactory, since the problem of "tap-outs" still exist as a major cause of furnace failure. A tap-out requires expensive relining with carbon, and a substantial loss of production follows, since furnaces newly relined do not attain average furnace efficiency for one or two months, out of a total average furnace lining life of 1½ to 3 years.

The common cause of failure of the refractories employed by prior workers is the reactivity of the refractories with aluminum and/or molten cryolite at 1,800° F. Thus, common silica-base refractories are reduced by aluminum to an aluminum-silicon alloy which forms a eutectic at about 11 pct. silicon, which melts about 150° lower than 1,200° F. at which pure aluminum melts. Also, the fluorides in molten cryolite are an avid solvent for silica. In similar fashion, alumina refractories are dissolved by cryolite, since cryolite is used in the Hall process specifically to dissolve alumina. Thus, ordinary refractory brick placed against the steel pot shell, even several inches thick, provides thermal insulation only and is subject to immediate chemical attack upon contact with either aluminum or cryolite.

In contrast to conventional refractories, the present invention comprises a comparatively thin but dense and truly chemically resistant refractory material which combats the molten cryolite and molten aluminum by freezing the attacking melt in the cracks, through formation of aluminum carbide and other high-melting intermetallic compounds. This invention contemplates the ready manufacture and placement of thin refractories and consists, in one embodiment, of a dense mass of refractory particles bonded to one or both sides of a flexible sheet of paper, plastic or metal. Individual refractory particles may be as large as 0.3 to 0.5 inch in diameter but are usually much finer. A graded mix must be used to insure that the voids between larger refractory particles are filled with smaller particles to form a dense mass. A satisfactory dense mixture analyzes 20 pct. (±3 pct.) on each of the following Tyler screen meshes: 28, 48, 100, 200 and 20 pct. finer than 200 mesh. Bonding agents between grains of refractory may be heat-setting fireclays, high alumina cements, sodium silicate, bitumens such as tars and pitches, or other plastic organic binders that fire to a carbonaceous binder which does not increase the reactivity of molten aluminum or cryolite. In the case of insulating the inside steel shell of aluminum furnaces, I find silicon nitride or silicon oxynitride refractory particles highly satisfactory, but satisfactory results are likewise possible with less expensive crude zircon and rutile particles, because zirconium and titanium oxides have much lower free energy of reduction by aluminum than silica or other metal oxides. These oxides of titanium and zirconium have a great advantage, in that the aluminum alloys produced by their partial reduction are much higher in melting point than pure aluminum, so that the crack filled with the attacking molten aluminum tends to freeze. Moreover, the diffusion of both titanium and zirconium into molten aluminum is very slow, so that titantium and zirconium are not able to diffuse through the cracks into the molten aluminum pool in the furnace before the cracks become plugged with a high-melting point alloy that forms a thick sludge of aluminum and titanium oxides, carbides and oxycarbides. Thus, the invention has a self-sealing action upon the leakage of molten aluminum or cryolite through cracks in the carbon lining to the steel shell or steel collector bars. It will be understood that a paper or cloth sheet (to which the refractory particles are attached) is destroyed or carbonized in the process of baking out the pot lining, so that only the refractory particles remain and the refractory is held firmly in place by the baked carbon of the pot lining and by the steel shell or collector bar to which it is cemented.

In other aspects of the invention, it may be desirable to bond the refractory particles to foil, micaceous material or asbestos paper that will retain some strength at high temperatures. Thus large cylindrical electrodes on an arc furnace may be given a nonoxidizing coating by winding a metal or asbestos tape coated with pitch (with or without refractory particles) around the electrode below the electrode holders. Or, such cylindrical electrodes may be wound with metal or asbestos tape prior to baking so that the tape bakes to form a smooth metal surface on the electrode after baking which protects the electrode against oxidation.

The foregoing embodiment finds particular application in the Soderberg electrodes utilized in aluminum furnaces. Thus, just above the electrolyte level, the relatively soft Soderberg electrodes are exposed to a somewhat oxidizing atmosphere at an elevated temperature, which tends to oxidize the carbon. By lining the electrode paste cavity with a suitable fire-resistant pre-coated paper, this problem will be totally avoided. Suitable materials for applying to a paper base include asbestos, cryolite and alumina mixtures applied with a sodium silicate binder. Alternatively, the paper may be manufactured from fibers and with sizings that are fireproof at the temperatures involved. In this manner, asbestos or glass wool fibers may be used in the paper itself, and sodium aluminate or phosphate fire-proofing agents applied thereto.

While it is, of course, desirable to utilize materials which will not contaminate the aluminum with unwanted impurities, it has been found that the quantities of such materials introduced in this way are entirely insignificant. In fact, it has been found to be entirely satisfactory to employ sodium silicate in or on the paper to attach alumina, cryolite or sodium aluminum silicate thereto without introducing a measurable amount of impurities into the melt.

It is to be noted that in the case of Soderberg electrodes, the anode pins normally employed to make electrical contact therewith can, when the invention is employed as hereinabove described, go right through the oxidation-resistant coating.

Figure 2:
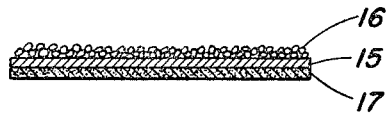
Figure 3:
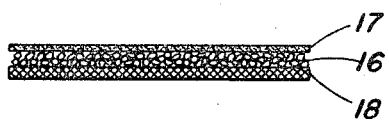
Figure 4:

It is believed that a better visualization of the foregoing problems, as well as the manner in which they are combatted by the present invention, will be gained by referring to the following detailed description thereof, taken in conjunction with the accompanying drawings, and in which, FIGURE 1 is a simplified cross sectional view of an electrolytic aluminum reduction cell employing the invention; and FIGURES 2, 3 and 4 are enlarged cross sectional views of three embodiments of the invention.

With reference to FIGURE 1, a Hall process aluminum furnace, designated generally at 1, is seen to comprise a steel shell 2 which provides a casing within which a pitch and carbon mass 3 is rammed and baked to form the pot lining. Imbedded steel electrical cathode collector bars 5 (only one shown) carry current of approximately 50,000 to 125,000 amperes and are insulated from the bottom steel plate by a powdered alumina refractory 4. The anode electrodes 7 carry current into the fused cryolite electrolyte 9 from which is reduced dissolved alumina to form a molten layer of aluminum 10. A frozen crust 8 generally covers the melt. Due to expansion forces caused by absorption of elements from the melt as well as the forces of expansion and contraction generated by heating and cooling, cracks 11 and 12 are formed in the carbon lining 3 and fill with molten aluminum from the metal layer 10. In the case of crack 12, the tendency is for the molten aluminum in the crack to alloy with the steel collector bar 5 and cut it in two, particularly since there is an electrical potential between the metal layer 10 and the collector bar 5 of about 0.3 to 0.5 volt. This is due to the electrical resistance of the carbon pot lining 3 to the current flowing through the furnace from anode to cathode. The present invention prevents the destructive corrosive action from the aluminum in cracks 11 and 12 by insulating the molten aluminum from bar 5 and shell 2 thermally, electrically and chemically. The refractory layer of the invention is shown at 13, and as the titania, zircon or other compounds contained therein partially dissolve in the aluminum in the crack 12, they cause it to become viscous and finally freeze, due to the formation of oxides, carbides and oxycarbides having very high melting points.

In similar fashion, the thin refractory layer 13 thermally, electrically and chemically insulates the steel shell 2 (to which it is physically bonded) from the molten aluminum in crack 11 which was formed in the carbon side lining of the pot lining 3. It is important that the thin insulation 13 be tightly bonded to the steel shell 2, so that the crack formed in the carbon lining will not break open the insulation 13. Such bond is made with a suitable thermal setting cement applied to the steel shell 2 when the insulation 13 is attached thereto during the lining of the furnace. When the molten aluminum in the crack 11 attacks the insulation 13, small amounts of the high melting refractories therein such as compounds of titanium and zirconium dissolve in the aluminum and cause it to become pasty and sluggish. At the same time the chilling effect of the comparatively cold steel shell 2 penetrates the crack 11 and causes it to freeze. Over a period of time, intermetallic compounds with high melting points or oxides, carbides and oxycarbides replace the molten metal in the crack 11 so that the crack is entirely filled with solid material. In this way, the thin refractories prolong the useful life of the carbon pot linings and increase the efficiency of a pot room which may contain several hundreds of such pots operated in series, and through which the currents of 50,000 amperes flow continuously.

For illustrative purposes, one of the anodes 7 in FIGURE 1 is shown as being sheathed in the insulating material of the invention, so that it is protected from oxidation above the frozen crust of cryolite 8.

FIGURE 2 is an enlarged cross section of the thin sheet of insulation designated as 13 in FIG. 1. The flexible sheet 15 in FIG. 2 may be composed of a metal foil such as very thin steel or a similar material. The dense layer of refractory particles 16 is composed of compounds such as titanium or zirconium oxides, carbides, nitrides, or silicon nitride, oxynitride or carbide. Fused alumina containing dissolved aluminum nitride or oxynitride and aluminum carbide or oxycarbide is also very suitable. The critical factor is that the refractory form high-melting compounds on contact with aluminum or aluminous material. The refractory "sandwich" illustrated in FIGURE 2 is completed by addition of a heat-setting cement 17 which is used to cement the sheet 15 to the steel shell 2 of the pot (FIG. 1).

On the other hand, when a starting sheet made of paper, cloth, fiber glass or plastic is used rather than a thin metal sheet 15, the embodiment illustrated in FIGURE 3 is preferred. In this embodiment, the cement 17 is attached directly to the refractory particles 16, which in turn are secured to the flexible sheet 18 with a suitable binder material. The cement layer 17 is used to firmly attach the refractory 16 to the steel shell and protect it from attack. Of course, the sheet 18, not being metal and not being kept cool by laying next to the comparatively cool steel shell of the pot, as in the previous case, will obviously be destroyed by heat as well as chemical corrosion. This will occur when the lining is initially baked.

FIG. 4 illustrates a somewhat different aspect of the invention. In this embodiment, the sheet 18 may be graphite cloth, aluminum silicate paper, paper, cloth, fiber glass, metal foil or plastic. The cement layer 17 may be any type of glue, adhesive or heat setting cement suitable to the applications outlined below. For many applications the cement employed may be similar to that commonly used on adhesive tapes or friction tapes. The heat insulating particles attached to 2 do not constitute a dense layer of particles several particles deep, as in FIGURES 2 and 3, but rather form a single layer of much larger particles 19 having approximately the same size. Alternatively, one larger size and another much smaller size may be used, as for example 10 mesh and 100 mesh particles that cover sheet 18 but prevent it from being heated by the dead air space between particles as well as the low heat conductivity of the particles themselves. The heat insulating particles are generally composed of conventional and common refractories such as silica sand, aluminum oxide or silicon carbide found on sand paper, aloxite paper and emory paper used in commerce, or may be more porous materials such as pumicite, expanded shale, vermiculite, porous slags or those organic foams which are commonly used for low temperature insulation. While the insulating particles 19 prevent conduction per se, this embodiment can be improved by coating the particles with an extremely thin layer of a material with lower radiation coefficient than the particle itself. This coating of the particles may be done by the well-known art of vapor plating in a vacuum, whereby, for example, metals such as aluminum may be deposited from their halides. In practice, this embodiment attains very high heat insulating properties by using several layers cemented one on top of the other. Thus, for heat insulating water pipes to prevent freezing in cold weather or to reduce heat losses in steam or water pipes, a tape several inches wide of the construction illustrated in FIG. 4 is used to wind around the pipes to form several porous layers thereon. Not infrequently, heat insulation of the type now currently used increases rather than decreases the heat losses from pipes by making the radiation and convection from the larger rough surface of the heat insulation greater than it would be from the smaller smooth surface of the bare metal pipe. This embodiment, by providing several layers of low heat radiation coefficient as well as low heat conduction coefficient (without large increase in diameter of the pipe being insulated) achieves the maximum possible insulating effect.

A further application of the invention involves use of refractories having very high melting points bonded to high melting foils or metal cloth made from zirconium or molybdenum, or fiber glass made of fused quartz fibers. Such a structure is well suited for use in nose cones of space vehicles that must withstand high reentry temperatures. In such a case, several successive layers of the heat insulation are needed. Table I (from Journal of Metals, May 1962, "Status and Future of Graphite and Refractory Compounds," by R. T. Dolloff and J. T. Meers), shows a number of carbides, borides, nitrides and silicides together with their melting points which are suitable refractories for certain applications of the invention exposed to high temperatures. Some refractories and particularly graphite may be made resistant to oxidation by vapor plating with metals or compounds that resist oxidation. For example, thin films of aluminum vaporized on refractories prevent oxidation because a surface layer of aluminum oxide forms which resists oxidation.

TABLE I—REFRACTORY CARBIDES

| Compound: | Melting point, ° C. |
| --- | --- |
| HfC | 3,890 |
| TaC | 3,880 |
| ZrC | 3,530 |
| CbC | 3,480 |
| $Ta_2C$ | 3,400 |
| TiC | 3,140 |
| $W_2C$ | 2,860 |
| VC | 2,830 |
| WC | 2,730 |
| SiC | 2,700 |
| MoC | 2,690 |
| $Mo_2C$ | 2,410 |
| $B_4C$ | 2,470 |
| $Cr_3C_2$ | 1,890 |

REFRACTORY BORIDES

| Compound: | |
| --- | --- |
| $HfB_2$ | 3,060 |
| $ZrB_2$ | 3,000 |
| $TaB_2$ | 3,000 |
| $TiB_2$ | 2,980 |
| $CbB_2$ | 2,900 |
| WB | 2,920 |
| $W_2B$ | 2,770 |
| $MoB_2$ | 2,100 |
| $VB_2$ | 2,100 |
| MoB | 2,080 |
| $Mo_2B$ | 2,000 |
| $Cr_3B_2$ | 1,960 |
| $CrB_2$ | 1,850 |

REFRACTORY NITRIDES

| Compound: | |
| --- | --- |
| HfN | 3,310 |
| BN | 3,000 |
| TaN | 2,980 |
| ZrN | 2,980 |
| TiN | 2,950 |
| CbN | 2,030 |
| VN | 2,030 |
| $Si_3N_4$ | 1,900 |

REFRACTORY SILICIDES

| Compound: | |
| --- | --- |
| $TaSi_2$ | 2,400 |
| $WSi_2$ | 2,150 |
| $Mo_3Si$ | 2,030 |
| $CbSi_2$ | 1,950 |
| $MoSi_2$ | 1,870 |

Less expensive modifications of this insulating material having some strength and resistance to deterioration above 1,000° C. are suitable for coating structural steel members used in building construction as an alternate to covering such beams with concrete, which covering is frequently employed at present to attain fire resistance necessary to conform with municipal building codes.

It is worthy of emphasis to note that the service life of the refractory materials of the invention will be increased if attention is paid to the coefficients of thermal expansion of the various materials employed in a given sheet. For example, a 36% Ni alloy steel such as "Invar" (a trade name) has a coefficient of thermal expansion of $0.9 \times 10^{-6}$, a 20% Ni steel has a coefficient of $19.5 \times 10^{-6}$, and carbon steel has a coefficient of $29 \times 10^{-6}$. By proper choice of alloy composition, the coefficient may be made to correspond roughly with the refractory coating, as for example aluminum oxide, which has a coefficient of $8.7 \times 10^{-6}$.

An alternative embodiment of the invention, of the general type illustrated in FIGURE 4, involves the use of two layers of different refractory materials, the outermost of which has substantially greater refractory properties. This embodiment combines relatively low cost and very high temperature properties. Thus, the super refractory outer layer of particles protects the less expensive, more flexible and usually thicker layer of lower-melting refractory particles beneath it, which in turn protects the flexible sheet having an even lower melting point and generally higher heat conductivity, the latter being particularly true if a metallic sheet is employed.

An example of the foregoing involves an alloy steel sheet with an initial coating of aluminum oxide and an outer coating of zirconium oxide. Such a structure will withstand flame temperatures up to 2,600° C. It is to be noted that the use of a metal sheet gives both mechanical strength and, by conducting heat away from the point of flame impingement, prevents hot spots which might pierce the refractory.

A second example involves the use of asbestos sheet or a paper made from aluminum silicate fibers as the base material. The said paper is now commercially available and has a melting point of about 1,750° C. and can be used continuously at about 1,250° C. A sheet of the type described is coated with a layer of zirconium oxide particles, and an outer, thin layer of thorium oxide is then applied. This material is capable of withstanding flame temperatures of over 3,000° C. Of course, steel tape may be used as a backing for the asbestos tape for greater mechanical strength. This also allows the asbestos to be made from short, inexpensive fibers rather than the long ones necessary when it is woven into a paper mat.

When the base material is a metal, a potential problem exists in carrying out a proper baking procedure to bond the refractory particles to the sheet and to each other without melting or otherwise metallurgically damaging the base sheet. This problem is readily overcome, however, by applying a flame such as oxyacetylene to the top of the refractory particles while at the same time running the sheet over one or more cooled rolls, or spraying water on the underside of the sheet while baking is going on.

It will be understood that various changes in the details, materials, steps and arrangements of parts, which have been herein described and illustrated in order to explain the nature of the invention, may be made by those skilled in the art within the principle and scope of the invention as expressed in the appended claims.

Having thus described the subject matter of the invention, what it is desired to secure by Letters Patent is:

1. In a carbon furnace electrode assembly, the improvement that comprises a wrapping on the outer surface of said electrode comprising a flexible strip of material, said strip having bonded thereto a mixture of graded refractory particles, whereby said electrode is rendered substantially immune to oxidation at ambient and elevated temperatures.

2. The electrode of claim 1, wherein the mixture of graded refractory particles comprise electrically non-conducting, size-graded refractory mineral particles which have been bonded as a dense layer onto said strip.

3. The electrode of claim 1, wherein said particles are selected from the group consisting of the oxides, carbides, nitrides, oxycarbides and oxynitrides of zirconium and titanium, the oxides of calcium and chromium, and the carbides, nitrides, oxycarbides, and oxynitrides of silicon and aluminum.

4. The electrode of claim 1, wherein said particles are bonded to said strip with a bonding agent selected from the group consisting of organic binders and a hydrate of an alkaline silicate.

5. The electrode of claim 1, wherein said refractory particles are bonded to each other as well as to said strip.

6. The electrode of claim 1, wherein said coated electrode comprises a Soderberg continuous electrode formed of carbon-pitch paste in a cavity and having anode pins therein for electrical connection and mechanical support.

7. The electrode of claim 6, wherein said flexible strip having a bonded mixture of refractory particles thereon lines said cavity so as to form a continuous surface of insulating material on said electrode as it is formed.

8. The electrode of claim 7, wherein said anode pins are inserted through said material and into said electrode.

References Cited

UNITED STATES PATENTS

| | | | |
|---|---|---|---|
| 2,992,127 | 7/1961 | Jones | 117—228 XR |
| 3,019,128 | 1/1962 | Smiley | 117—228 |
| 3,249,460 | 5/1966 | Gerry | 117—70 |
| 3,303,119 | 2/1967 | Dell | 204—290 |

JOHN H. MACK, *Primary Examiner.*

D. R. JORDAN, *Assistant Examiner.*

U.S. Cl. X.R.

117—228; 204—243